United States Patent
Zhu et al.

(10) Patent No.: US 12,314,753 B2
(45) Date of Patent: *May 27, 2025

(54) PREFLIGHT CHECKS FOR HARDWARE ACCELERATORS IN A DISTRIBUTED SYSTEM

(71) Applicant: Google LLC, Mountain View, CA (US)

(72) Inventors: Jiafan Zhu, San Jose, CA (US); Jianqiao Liu, Basking Ridge, NJ (US); Xiangyu Dong, Sunnyvale, CA (US); Xiao Zhang, San Jose, CA (US); Jikai Tang, Santa Clara, CA (US); Kexin Yang, Sunnyvale, CA (US); Yong Zhao, Sunnyvale, CA (US); Alireza Ghaffarkhah, San Jose, CA (US); Arash Rezaei, Saratoga, CA (US); Dayou Du, Jersey City, NJ (US); Yazhou Zu, San Francisco, CA (US); Xiangling Kong, Sunnyvale, CA (US); Hoang-Vu Dang, San Jose, CA (US); Alexander Vadimovich Kolbasov, Palo Alto, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/667,501

(22) Filed: May 17, 2024

(65) Prior Publication Data

US 2024/0385873 A1 Nov. 21, 2024

Related U.S. Application Data

(63) Continuation of application No. 17/540,123, filed on Dec. 1, 2021, now Pat. No. 12,020,063.

(51) Int. Cl.
*G06F 9/48* (2006.01)
*G06F 9/50* (2006.01)
(Continued)

(52) U.S. Cl.
CPC .......... *G06F 9/4843* (2013.01); *G06F 9/5027* (2013.01); *G06F 11/3024* (2013.01); *G06F 11/3433* (2013.01)

(58) Field of Classification Search
CPC . G06F 9/46; G06F 9/48; G06F 9/4806; G06F 9/4843; G06F 9/4856; G06F 9/50;
(Continued)

(56) References Cited

U.S. PATENT DOCUMENTS

| 9,152,532 B2 | 10/2015 | Breternitz et al. |
| 10,133,619 B1 | 11/2018 | Nagpal et al. |

(Continued)

FOREIGN PATENT DOCUMENTS

| WO | WO 2018102456 | 6/2018 |
| WO | WO 2018162047 | 9/2018 |

OTHER PUBLICATIONS

International Preliminary Report on Patentability in International Appln. No. PCT/US2022/042780, mailed on Jun. 13, 2024, 8 pages.

(Continued)

*Primary Examiner* — Andy Ho
(74) *Attorney, Agent, or Firm* — Fish & Richardson P.C.

(57) ABSTRACT

Methods, systems, and apparatus, including computer programs encoded on computer storage media for performing preflight checks of a distributed computing system, are described. In one aspect, a method includes assigning a computing workload to a first subset of hardware accelerator machines each having one or more hardware accelerators. A preflight check on the first subset is performed before performing the computing workload to verify the functionality of each machine in the first subset. For each hardware accelerator machine of the first subset, a program code package is installed, including a task action based at least in part on characteristics of the computing workload. The task (Continued)

action including a sequence of operations is performed on the hardware accelerator machine to determine whether the task action fails. Whenever the task action fails, the computing workload is re-assigned to a second subset of hardware accelerator machines different from the first subset.

20 Claims, 7 Drawing Sheets

(51) Int. Cl.
  *G06F 11/30* (2006.01)
  *G06F 11/34* (2006.01)
(58) Field of Classification Search
  CPC ...... G06F 9/505; G06F 9/5005; G06F 9/5011; G06F 9/5044; G06F 9/5055
  See application file for complete search history.

(56) References Cited

U.S. PATENT DOCUMENTS

| | | |
|---|---|---|
| 10,152,382 B2 | 12/2018 | Liu |
| 11,275,622 B2 | 3/2022 | Li et al. |
| 2009/0150718 A1 | 6/2009 | Park et al. |
| 2018/0159717 A1 | 6/2018 | Cormie et al. |
| 2020/0026630 A1 | 1/2020 | Schardt et al. |
| 2021/0117307 A1 | 4/2021 | MacNamara et al. |
| 2021/0165730 A1 | 6/2021 | Surya et al. |
| 2022/0129593 A1* | 4/2022 | Tsirkin .................. G06F 21/79 |

OTHER PUBLICATIONS

International Search Report and Written Opinion in International Appln. No. PCT/US2022/042780, mailed on Nov. 30, 2022, 13 pages.

* cited by examiner

PREFLIGHT CHECKS FOR HARDWARE ACCELERATORS IN A DISTRIBUTED SYSTEM

CROSS-REFERENCE TO RELATED APPLICATION

This is a continuation of U.S. application Ser. No. 17/540,123, filed on Dec. 1, 2021, the disclosure of which is considered part of and is incorporated by reference in the disclosure of this application.

TECHNICAL FIELD

This specification relates to performing preflight checks for hardware accelerators in a distributed computing system.

BACKGROUND

Artificial intelligence (AI) is intelligence demonstrated by machines and represents the ability of a computer program or a machine to think and learn. One or more computers can be used to perform AI computations to train machines for respective tasks. The AI computations can include computations represented by one or more machine learning models.

Neural networks belong to a sub-field of machine-learning models. Neural networks can employ one or more layers of nodes representing multiple operations, e.g., vector or matrix operations. One or more computers can be configured to perform the operations or computations of the neural networks to generate an output, e.g., a classification, a prediction, or a segmentation for a received input. Some neural networks include one or more hidden layers in addition to an output layer. The output of each hidden layer is used as input to the next layer in the network, i.e., the next hidden layer or the output layer. Each layer of the network generates an output from a received input in accordance with the current values of a respective set of network parameters.

Hardware accelerators that are particularly designed can perform specific functions and operations, including operations or computations specified in a neural network, faster and more efficiently when compared to operations run by general-purpose central processing units (CPUs). The hardware accelerators can include graphic processing units (GPUs), tensor processing units (TPUs), video processing units (VPUs), field programmable gate arrays (FPGAs), or application-specific integrated circuits (ASICs).

SUMMARY

Hardware failures are common in large-scale distributed computing systems, which can cause workloads or tasks that are running on the distributed computing system to be terminated, failed, or evicted or to generate outputs that are inaccurate or erroneous. For example, some example common hardware failures include nodes (e.g., hardware accelerator machines) having a faulty hardware accelerator, physical interconnection failures among hardware accelerators in a node or across two or more nodes, and wireless communication failures between follower nodes or between follower nodes and a leader node. For brevity, distributed computing systems are also referred to as distributed systems and can include interconnected computing machines, e.g., nodes, that can include hardware accelerators.

Hardware accelerators can fail due to various causes. For example, hardware accelerators in one or more nodes can fail within a couple of months of deployment due to internal defects, even though these hardware accelerators might have passed various tests during manufacturing, integrating, or deploying stages. These internal defects can be exposed by days or weeks of heavy use. As another example, hardware accelerators can suffer from transistor aging, where silicon transistors have developed flaws over time of use. Transistor aging can degrade the performance and reliability of the hardware accelerators and can generate inaccurate and/or untrustworthy outputs.

The hardware accelerator failures can sometimes be obscured and hard to diagnose. For example, an ASIC in a node can fail without generating any symptoms that could be detected by a health-checking module. This is because the ASIC can still provide outputs, though inaccurate, and communicate with other ASICs, a leader node, or a follower node, even when one or more tiles in the ASIC fail and render the outputs untrustworthy.

In addition, hardware interconnections can fail. For example, large computing workloads or tasks, e.g., user jobs associated with training a machine learning model, generally require a great number of computation resources. The distributed system is therefore configured to assign the large computing workloads to multiple hardware accelerators from one or more nodes to perform the jobs. The multiple hardware accelerators are connected using high-speed interfaces, e.g., peripheral component interconnect (PCI) express, inter-chip interconnect (ICI), and/or Ethernet. These high-speed interfaces can fail, for example, due to cable degradation, circuit aging, fiber cavity, and dust contamination.

The term "computing workloads" as used throughout this document refers to data representing multiple operations to be performed by a distributed system, e.g., a user job. The computing workloads each can be generated through respective workload configurations with multiple parameters. For example, the workload configuration parameters can be specified by a user, e.g., quantities and types of hardware accelerators requested to perform operations, a time period for performing the operations, and a memory address for fetching input data for computations or storing outputs. The computing workloads can include long-running jobs, which handle short and latency-sensitive requests (e.g., from microseconds to a few hundred milliseconds), and batch jobs, which are less sensitive to latency and can take from a few seconds to a few days to complete. The computing workloads each can be further associated with a priority level, upon which a system can allocate computation resources and an order to perform the jobs. For simplicity, the term "computing workloads" is also referred to as jobs in the following specification.

A distributed system can take actions to handle hardware failures and/or prevent hardware failures from adversely affecting computing workloads being executed by the distributed system. For example, a distributed system can reduce correlated failures by spreading portions of a job to different nodes in a cluster when assigning hardware accelerators to perform the operations of a computing workload. Alternatively, methods can be performed when performing operations specified in a computing workload. For example, a distributed system can generate replications for performing the same portion of the computing workload, store persistent states in a distributed file system, or apply one or more checkpoints at a particular time interval.

However, the above-noted techniques are not capable of diagnosing hardware failures after assigning computation resources to perform a computing workload and before running the computing workload. Preflight checks described in this document are capable of detecting and diagnosing such hardware failures. A preflight check over the assigned computation resources (e.g., hardware accelerators and interconnections) is important because a preflight check can verify whether any of the assigned computation resources malfunction or fail before the distributed system performs the computing workload and runs into job failures. This preflight check can improve throughput and computation efficiency by reassigning the computing workload to other proper computation resources, generating reports indicating malfunctioning computation resources, and resolving the potential hardware failures ahead of time. By diagnosing failures or failing hardware accelerators and/or networking components prior to the workload being executed, future errors are prevented which reduces application downtime, errors caused by such downtime, delays that occur when migrating the workload to other hardware accelerators, and inaccurate or erroneous outputs being generated by the distributed system.

In addition, different hardware accelerators can require different firmware, drivers, or configurations, and can be set to different modes. Each mode can require a different set of metrics for determining whether the hardware accelerator is "healthy" (i.e., functioning properly).

Furthermore, for security reasons, all hardware accelerators (e.g., ASICs) need to be reset to default settings, and all of the memories and storage associated with the ASICs need to be cleared (e.g., by setting the values to zero or other default or pre-workload values) between two different computing workloads.

The described techniques in this specification relate to a preflight check mechanism for a distributed system, which can address at least the above-noted problems. More specifically, the described preflight check techniques can prevent the malfunctioning hardware accelerators from affecting the process of performing computing workloads in a distributed system.

The described techniques can also diagnose hardware failures, report the diagnosis information with actionable information that can be used to take corrective action, and request different corrective actions for the diagnosed hardware accelerators or nodes before the system starts performing an associated computing workload. The corrective actions can be, for example, rebooting a node, reinstalling a software package on a node, or replacing hardware components or cables in a tray.

The described techniques can further perform pre-job operations, or post-completion operations, or both for a node. Pre-job operations can include installing particular firmware or setting parameters to pre-determined values suitable for the hardware accelerators, which can improve the computation efficiency. Post-completion operations can include a "cleaning" process to clear memories or storage, which can avoid memory leakage and protect customers' data privacy.

Pre-job operations and post-completion operations can be further used to determine hardware failures. For example, if any of the pre-job operations or post-completion operations fails, a system performing the described technique can determine whether the failure is due to hardware failures and generate information for corrective operations. One example of the pre-job operations can include operations for performing a small portion of a computing workload, e.g., a machine-learning-related workload, using the selected hardware accelerators and/or networking components, and monitoring for performance issues. If the system determines there are errors or inaccuracies in the computation results on a hardware accelerator or hardware accelerator machine, the system can identify the failed accelerator or machine and generate actionable information that can be used to take corrective action. If the system finds no issues, the system can start performing the full workload.

The time period for performing the pre-job and post-completion operations is generally short, e.g., from milliseconds to a few seconds based on characteristics of the received workload, which enables the operations to be performed without introducing significant latency to the process.

According to one aspect, a method for performing a preflight check on one or more hardware accelerators in one or more hardware accelerator machines of a distributed computing system include: receiving data representing a workload configuration, generating a computing workload representing a set of operations to be performed by the distributed computing system based on the workload configuration, and assigning the computing workload to a first subset of hardware accelerator machines that each include one or more hardware accelerators.

Before performing the computing workload, the method further includes performing a preflight check on the first subset of hardware accelerator machines to verify the functionality of these machines. The functionally can include hardware failures such as hardware component failures and hardware interconnection failures. To perform the preflight check, the method includes for each hardware accelerator machine of the first subset, installing a program code package at the hardware accelerator machine, where the program code package includes a task action that represents a sequence of operations to be performed by a node manager at the hardware accelerator machine. The task action is based at least in part on characteristics of the computing workload. The method further includes performing the sequence of operations on the hardware accelerator machine to determine whether the task action fails, re-assigning the computing workload to a second subset of hardware accelerator machines whenever the respective tasks action fails, and performing the computing workload using the first subset of hardware accelerator machines whenever the task action does not fail.

In some implementations, verifying the functionality of the first subset can be based at least in part on characteristics of one or more hardware accelerators of the first subset and the characteristics of the computing workload. The verification process can include checking at least one or more arithmetic errors, interconnection bit-error rates, topology errors, and inter-accelerator interconnections.

In some implementations, the task action can include a pre-start task action and a post-completion task action. The pre-start task action can include a first sequence of operations to be performed by the node manager at the hardware accelerator machine before performing the computing workload. The post-completion task can include a second sequence of operations to be performed by the node manager at the hardware accelerator machine after completing the computing workload.

In some implementations, The preflight checker binary can be implemented by integrating the preflight checker binary with a computing workload or installing the preflight checker binary as a machine daemon on the hardware accelerator machine. The implementation is determined based at least in part on one or more of a measure of disk space consumption, root privilege of an operating system, or release cadence.

Particular embodiments of the subject matter described in this document can be implemented to realize one or more of the following advantages. The techniques described in this specification can improve the computation efficiency. Preflight checks over assigned hardware accelerators before performing operations specified in a computing workload can improve computation accuracy, prevent outputs from being contaminated by inaccurate results from malfunctioning or failed hardware accelerators or interconnections, and reduce or eliminate job failures or terminations. Although performing the preflight checks might increase latency in scheduling a computing workload, the delay is bounded within seconds, whereas correcting errors and/or reassigning accelerators to the workloads can take minutes or hours. The preflight checks are faster compared to other hardware tests that normally take hours or days, and such a delay is negligible compared to computing workloads that might require hours or days of runtime. By addressing diagnosed failures prior to initiating the computing workload using a selected set of hardware accelerators, delays in completing the operations of a workload due to the failure of components or interfaces during execution can be avoided, resulting in substantial latency savings and enhanced user experience even considering any slight delays introduced by the preflight check.

In addition, the techniques described in this document can perform satisfactory diagnosis for hardware accelerators or nodes in a cluster. As described above, the described techniques can determine whether one or more hardware accelerators include faulty tiles and whether the hardware failure belongs to an accelerator failure or interconnection failure. The described techniques can provide the above-noted information to a machine manager for further "health check," with proposed corrective actions to resolve the failure, e.g., rebooting a node, reinstalling a software package, replacing one or more accelerators in a tray, or replacing cables or interfaces in a tray. This increases the speed at which failed components or interfaces are diagnosed, sent to repair, or are repaired and put back into service within the distributed system, or any combination thereof.

Furthermore, the techniques described in this document can robustly configure and reset different hardware accelerators or nodes, which can improve the computation efficiency or speed of the hardware accelerators or nodes. For example, the described techniques can configure different hardware accelerators or nodes with different firmware and runtime parameters based on the respective characteristics of the hardware accelerators or nodes before running a computing workload. In addition, the described techniques can ensure data privacy between different users. For example, node managers can reset runtime parameters, or clear up memories and storage, or both for different hardware accelerators or nodes after completing a computing workload, which can avoid potential data leakage and protect users' privacy.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
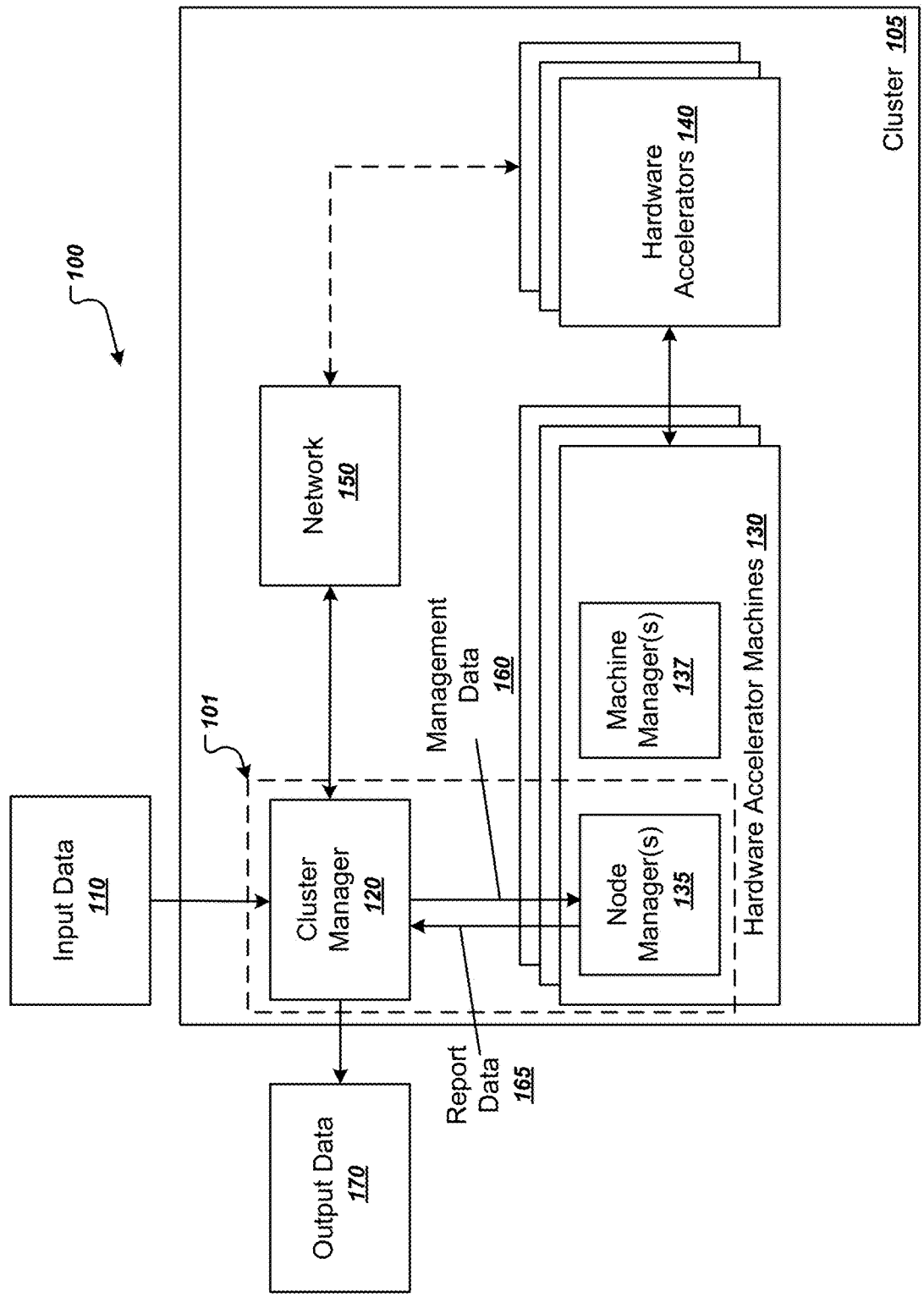
FIG. 1 illustrates an example architecture of a distributed system 100 in which a cluster management system manages the operation of a cluster of hardware accelerators.

FIG. 1 illustrates an example distributed system 100 in which a cluster management system 101 manages the operation of a cluster of hardware accelerators 140. The cluster management system 101 is an example management system that can be included in a distributed system 100 and implemented on one or more computers (e.g., nodes or machines) in one or more locations, in which systems, components, and techniques described below can be implemented. Some of the components of the cluster management system 101 can be implemented as computer programs configured to run on one or more computers.

A distributed system 100 can include one or more clusters of nodes and each node can have one or more hardware components. The multiple hardware components can be communicatively connected to each other within the node or across different nodes, physically or wirelessly, to collaboratively perform operations specified by one or more instructions, e.g., instructions of computing workloads such as user jobs. For example, a distributed system 100 can be a cloud computation system, and multiple clusters of the system can be coupled with each other using a high-performance network or other appropriate networks. Although the systems and techniques described in this document can apply to various types of computing workloads, the description that follows is largely in terms of user jobs.

As shown in FIG. 1, a cluster 105 can be included in a distributed system 100 that includes one or more other clusters communicatively coupled to cluster 105. Each cluster in the distributed system 100 can include multiple hardware accelerator machines 130 (or equivalently, nodes) communicatively coupled with each other. The hardware accelerator machines 130 can be arranged in a tray connected to a host or connected through a network interface card (NIC). For example, a cluster can include ten, a hundred, ten thousand, or another appropriate number of hardware accelerator machines 130.

Each hardware accelerator machine 130 can be managed by a respective node manager 135, and optionally by a machine manager 137. Although the term "machines" and "nodes" are typically interchangeable, both of which could be referred to as a computer server including one or more hardware accelerators of different types, the term "node" could also be defined based on virtualization of resources. Therefore, in some implementations, the hardware accelerator machines 130 each can include one or more nodes. For example, a hardware accelerator machine 130 can include one or more trays, where each tray can be considered as a node with one or more processors and/or accelerators. As another example, a hardware accelerator machine 130 can include one or more NICs coupled with one or more hardware components, e.g., accelerators and/or processors, where the hardware components connected to a NIC can be considered as a node. Please note that the above-noted hardware machines with one or more nodes 130 can be also managed by a node manager 135, and optionally by a machine manager 137.

Each accelerator machine 130 can be heterogeneous. In other words, each hardware accelerator machine 130 can include or be communicatively coupled with multiple hardware accelerators 140 having heterogeneous types and sizes. In general, the hardware accelerator 140 can be any type of accelerator that is suitable for a particular computation requirement. For example, the hardware accelerators can include GPUs, TPUs, VPUs, FPGAs, and/or ASICs. In another example, the hardware accelerators 140 can be other types of processors, e.g., general-purpose CPUs that may not be configured to accelerate machine learning or other types of computations that benefit from accelerators. Each hardware accelerator machine 130 can have different accelerators coupled with one another directly or indirectly to a data center network (DCN). In some implementations, hardware accelerators of different hardware accelerator machines can be connected to a dedicated bag-on-the-side network (e.g., the dedicated bag-on-the-side network 275 of FIG. 2) and communicate with one another and be controlled by a topology manager (e.g., the centralized topology manager 280 of FIG. 2). Note that the term "DCN network" is also referred to as network (e.g., network 150 of FIG. 1 or network 230 of FIG. 2) in the following description for simplicity, and the term "bag-on-the-side network" throughout this document refers to a network connecting extended computation resources and functionalities. More specifically, the term "bag-on-the-side network" is configured to provide a particular communication among a subset of servers or hosts coupled in a data-center network (DCN). The bag-on-the-side network might not need to be communicatively coupled with the DCN, the Ethernet, or any internet protocols. For example, a TPU bag-on-the-side network can include one or more TPUs that are located in a TPU device and are coupled with one another using a bag-on-the-side network (e.g., a high-speed interconnect), so that each TPU in the TPU device can directly communicate with each other. However, the TPU device can be coupled with the DCN using any suitable traditional networking. The different types of hardware accelerator machines 130 are described in greater detail in connection with FIG. 2.

Generally, cluster 105 can receive input data 110. The input data can include a computing workload, e.g., user job, specifying multiple operations to be performed by one or more hardware accelerator machines 130 included in the cluster 105. The hardware accelerator machines 130 can generate output data 170 that includes at least outputs generated by performing operations of the computing workload. For example, the input data 110 can include data representing a machine learning model (e.g., a trained neural network), which specifies machine learning operations, e.g., inference operations for processing a frame of input data (e.g., an input image) at a time step to generate an inference output (e.g., a prediction of face recognition). In another example, the input data 110 can include data to be processed using a machine learning model, e.g., a machine learning model included in the input data 110 or a machine learning model already stored at cluster 105 or elsewhere in the distributed system 100.

The cluster management system 101 described in this document is configured to perform a preflight check on assigned hardware accelerators 140. The output data 170 can include data indicating diagnostic information of one or more hardware failures or potential hardware failures that are predicted to occur in the future. The details of the preflight check mechanism are described below.

The cluster management system 101 can include at least a cluster manager 120 deployed on a server or a host and a node manager 135 installed on each hardware accelerator machine 130. In general, cluster manager 120 can assign a computing workload to multiple accelerator machines and instruct node managers 135 on each accelerator machine to perform preflight checks to determine whether the assigned accelerator machines suffer from any hardware failures.

The cluster manager 120 can perform analysis on characteristics or requirements specified in a computing workload included in the input data 110 and assign a particular set of one or more hardware accelerator machines 130 to perform the computing workload according to the analysis. The analysis can include, for example, determining available hardware accelerators for performing the computing workload, and a respective availability period for each of the available hardware accelerators. In some implementations, the cluster manager 130 can be coupled with a scheduler (e.g., the scheduler 215 of FIG. 2) to assign computation resources for a computing workload. The cooperation of a scheduler and a cluster manager is described in more detail in connection with FIG. 2.

The node manager 135 is a local agent configured to initiate or terminate the performance of an assigned computing workload or a portion of the assigned computing workload on a hardware accelerator machine 130. The node manager 135 can further manage local resources, e.g., by manipulating operating system kernel settings, rolling over debug logs, or reporting a state of a hardware accelerator machine 130 to the cluster manager 120, or manage other monitoring systems (e.g., a health monitoring system of the distributed system or for multiple clusters, which is not depicted in FIG. 1), or both.

Data indicating the state of a hardware accelerator machine can include data indicating quantities and types for available hardware accelerators included in a hardware accelerator machine for performing the assigned job. For example, when a computing workload requests eight hardware accelerators in the cluster 105, a node manager 135 located on a first hardware accelerator machine 130 can report to the cluster manager 130 that there are three GPUs available for the computing workload, and another node manager might report that there are five TPUs available on another machine. In some implementations, the data indicating the state of the hardware accelerator machine can also include data indicating whether one or more hardware accelerators of the hardware accelerator machine and/or interconnections between hardware accelerators of the hardware accelerator machine (and/or between these hardware accelerators and hardware accelerators of other hardware accelerator machines) are failed and, if so, the failed hardware accelerators and/or interconnections. This data can also indicate which hardware accelerators and interconnections are functioning properly and, as noted above, their availability to be assigned to a new computing workload.

In addition, a node manager 135 can launch an assigned computing workload in a corresponding hardware accelerator machine 130 independently from other machines. Alternatively, node managers of different machines can further coordinate hardware accelerators with one another in regards to performing respective portions of a computing workload. That is, the node managers can interact to coordinate their respective hardware accelerators in performing operations of a computing workload.

The cluster manager 120 can communicate with each node manager, e.g., the node managers for each hardware accelerator machine 130 in the cluster 130. More specifically, the cluster manager 120 can send, to a node manager 135, management data 160 that includes instructions that instruct the node manager 135 to install one or more program code packages or perform operations corresponding to a computing workload. The installed program code packages can include operations (e.g., a task action) that are managed by the node manager 135 and that are to be performed by the hardware accelerator machine 130 pre-flight (i.e., before performing the computing workload) to detect whether there are any hardware failures associated with the machine. The hardware failures can include, e.g., hardware accelerator failures or interconnection failures with one or more hardware accelerators.

The cluster manager 120 can periodically poll each node manager to receive report data 165 indicating the hardware accelerator machine's current state (e.g., available computation resources or any hardware failure information). The cluster manager 120 can periodically request report data 165 from node managers 135, e.g., every few seconds. For example, if a node manager 135 does not respond to a couple of polls, the cluster manager 120 can mark the node 130 as "down" or "not available" due to failures such as a power failure, hardware component failures, or interconnection failures. If so, the cluster manager 120 can re-assign the computing workload to another hardware accelerator machine 130. In some other situations, where one or more hardware accelerators 140 in a hardware machine 130 does not respond to a corresponding node manager 135, the node manager 135 can mark the unresponsive accelerators as "down" or "not available" and encode the marks in the report data 165. The cluster manager 120 can re-assign the computing workload to other responding hardware accelerators 130 in the same machine 130.

As another example, when a hardware accelerator machine 130 appears to be available to a cluster manager 120, a node manager 135 can provide, to the cluster manager 120, report data 165 that further includes a change or update in hardware accelerator availability, and optionally reason or causes for the change of availability. For example, a node manager 135 can provide report data 165 indicating that there are two hardware accelerators that are no longer available due to malfunctioning tiles (e.g., computing units coupled with one another in a hardware accelerator to perform operations). The cluster manager 120 can then re-assign the computing workload to other available and functioning accelerators in the same machine or in another machine. The details of report data 165 and the reporting process are described below.

In some implementations, the cluster management system 101 can further include a machine manager 137 deployed on each hardware accelerator machine 130, or can be communicatively coupled, e.g., wired or wirelessly, with a machine manager 137. The machine manager 137 can be in the form of a daemon—a computer-readable program code continuously running as a background process in a system container without direct user control—and can be configured to collect telemetry data from all hardware accelerators 140 on the hardware accelerator machine 130. The telemetry data can include data statistically measured in-situ (e.g., measured while the system is still running) including computation resource usage and/or utilization, data transfer patterns, interconnections, overheads, running time, and power consumption. The machine manager 137 can monitor abnormal system behaviors and generate symptom data indicating machine failures.

Note that the machine failures are different from the above-noted obscured and unobvious hardware failures that are hard to be diagnosed by conventional techniques. For example, the machine failures are generally local to a hardware accelerator machine. The machine manager 137 generally determines the machine abnormalities or failures based on collected telemetry data associated with a local hardware machine or machine configurations—not based on characteristics or configurations of a particular computing workload (e.g., not application-based). Factors used by the machine manager 137 to determine a machine failure can include, for example, missing responses from a hardware accelerator under a particular request, a response delay beyond a threshold value, and a detected disconnection in a machine.

Figure 2:
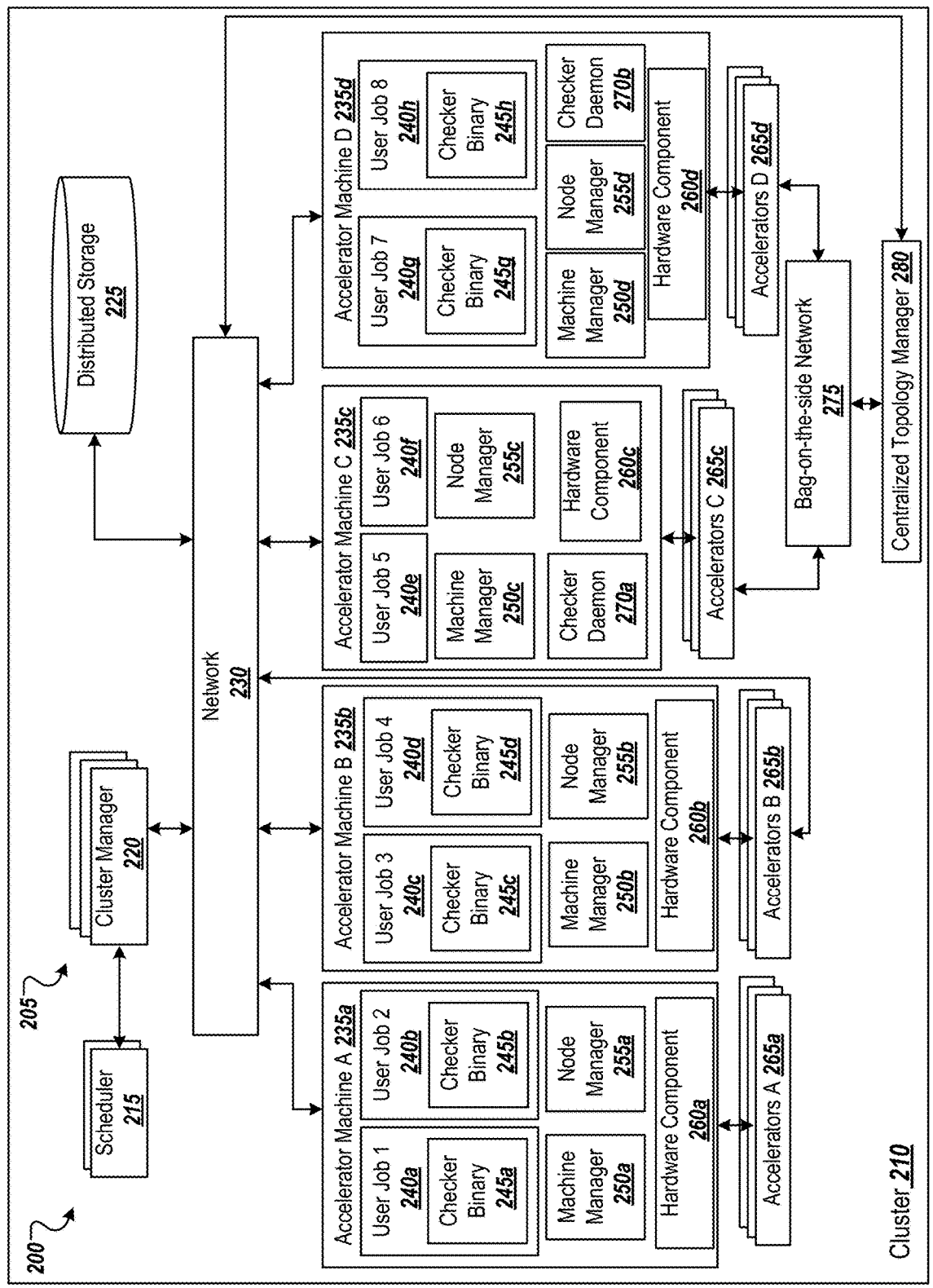
FIG. 2 illustrates another example architecture of a distributed system 200 having multiple types of accelerator machines

FIG. 2 illustrates another example architecture of a distributed system 200 having multiple types of accelerator machines 235a-d.

As shown in FIG. 2, a distributed system 200, which can be similar to or equivalent to the distributed system 100 shown in FIG. 1, can include multiple cluster(s) 210 although only one cluster 210 is shown for clarity. Each cluster 210 can include multiple hardware accelerator machines, e.g., accelerator machine A 235a, accelerator machine B 235b, accelerator machine C 235c, and accelerator machine D 235d. Each hardware accelerator machine 235a-d can be of a different type than each other hardware accelerator machine. The details of each type of hardware accelerator machine are described below.

The cluster 210 can include one or more cluster managers 220 (e.g., cluster manager replicas). The distributed system 200 can receive workload configuration data that indicates a computing workload, e.g., a user job, configuration specified by a user or user device. The workload configuration can include, e.g., specify, operations of the user job, a total runtime for the user job, and computation resources required or that would be sufficient for performing the operations of the user job. The operations can include machine learning, e.g., inference, operations of a machine learning model that may also be included in the workload configuration data. The cluster manager 220 can generate a user job based on the workload configuration and deploy the user job to a subset of hardware accelerator machines to perform the user job based on resource availability. For example, a node manager 255a-d installed on a hardware accelerator machine 235a-d can provide information indicating a state of the hardware accelerator machine or hardware accelerators coupled with the machine to the cluster manager 220, as described above.

Each cluster manager 220 can be communicatively coupled with one or more schedulers 215 (e.g., scheduler replicas). Upon receiving a computing workload from a cluster manager 220, a scheduler 215 can first scan, e.g., asynchronously or synchronously, all the computation resources in the distributed system 200 and determine whether there are enough computation resources that are currently available to satisfy the computation requirement specified in the computing workload.

When receiving multiple user jobs from different users, the scheduler 215 is configured to generate a priority level associated with a user, or a user job, or both. In some implementations, the priority level can be represented by data stored in the cluster manager or associated with workload configurations. In addition, the scheduler 215 can adopt a ranking or queueing scheme (e.g., a round-robin scheme) to ensure fairness across different users and avoid blocking other users due to a large user job that consumes a large portion of the available computation resources of the cluster 210.

The scheduler 215 can receive and scan multiple computing workloads according to the priority level, e.g., from high to low priority levels, in the queue so that computing workloads with high priority levels are deposited higher in the queue than those with lower priority levels. Operations arranged higher in a queue are generally performed earlier than operations that are lower in the queue.

The distributed system 200 can further include distributed storage 225, or another appropriate type of data storage system or device, communicatively coupled with a network 230 (e.g., a DCN as described above). The distributed storage 225 can be configured to store data used by the various components of the distributed system 200. For example, the data can include configuration data or firmware for hardware accelerator machines, parameters for performing operations specified in user jobs (e.g., weights and hyperparameters for a trained neural network model), intermediate results or results calculated by the hardware accelerators, or information data indicating the states of hardware accelerator machines, hardware accelerators, or clusters (e.g., states such as availability, "health condition," quantities, or types). Other components such as a cluster manager 220, a hardware accelerator machine 235a-d, and a node manager 255a-d can access the distributed storage 225 through the network 230.

In some implementations, the distributed system 200 can further include machine managers 250a-d installed on the hardware accelerator machines 235a-235d, respectively. The machine managers 250a-d can be configured to run in the background and measure telemetry data for the machine in-situ. The telemetry data can be used, for example, to determine interconnections between accelerators located within one or more hardware accelerator machines.

The distributed system 200 can further include a bag-on-the-side network 275. The bag-on-the-side network 275 can be used to expand hardware accelerators or other hardware components to the distributed system 200. As described above, a bag-on-the-side network can provide specialized and high-performance networking for a subset of hosts or servers that are coupled in a DCN. The bag-on-the-side network can be independent of the DCN or might not need to be directly coupled with the DCN. A bag-on-the-side network can also include a control plane (e.g., functions or processes that determine which path to use for sending packets and/or frames), or a data plane (e.g., functions or processes that forward packets and/or frames from an interface to another based on the control plane logic), or both.

In addition, the distributed system 200 can include a centralized topology manager 280. The centralized topology manager 280 can be configured to route or link hardware accelerators according to a computing workload so that the linked hardware accelerators can perform the assigned workload. The centralized topology manager 280 can further generate an expected topology of the assigned accelerators and provide the expected topology to the node managers 255a-d to determine interconnection failures in the network.

As described above, a cluster manager 220 can determine a subset of hardware accelerator machines to perform one or more user jobs. Before performing the user jobs, a cluster management system (e.g., the cluster management system 101 shown in FIG. 1) can perform preflight checks over the subset of hardware accelerator machines and their corresponding hardware accelerators. The preflight checks can be a group of operations performed by the cluster management system 205 to determine hardware failures in the distributed system 200.

To perform the preflight checks, the cluster manager 220 can generate instruction data including a program code package, and instruct each node manager 255a-d to install the program code package on each of the subset of hardware accelerator machines. The program code package can include a preflight checker binary specifying processes or operations for performing the preflight checks.

The preflight checker binary is a low-level machine-readable program code in the form of 0s and 1s. The preflight checker binary can be deployed as a separate machine daemon, similar to a machine manager as described above. Alternatively, the preflight checker binary can be integrated as a part of a user job, e.g., as an additional program code included with the user job rather than being generated separately by the cluster manager 220. The determination of deploying the preflight checker binary as a stand-alone checker daemon or as a sequence of operations integrated into a user job can be determined based on trade-offs between persistent disk space consumption, root privilege of an operating system (e.g., Linux), and release cadence (e.g., a time period or interval between releases or updates of a machine daemon) Typically, when a preflight checker binary is implemented as a stand-alone checker daemon, the preflight checker daemon can be granted the root privilege to access more resources of a distributed system, but it may require more disk space and have a slower release cadence. In addition, a stand-alone checker daemon can have a slower release cadence than a program code integrated into a user job, because a machine daemon is one part of foundation software that supports a machine's normal operations, which requires more testing or qualifications and is therefore released at a slower pace.

In some implementations, the preflight checker binary can be encoded in a program code package, installed on a hardware machine, and implemented in a user job, and then the hardware machine can use the same preflight checker binary for one or more different user jobs. In this way, the system can perform preflight checks more flexibly with high performance and security.

The preflight check of the preflight checker binary, whether implemented as a stand-alone checker daemon or integrated into a user job, is performed or executed before performing the user job. The preflight checker binary can be executed on a hardware accelerator machine 235a-d immediately before the scheduler 215 launches a user job on the hardware accelerator machine 235a-d. In this way, the cluster management system can minimize the time gap between performing the preflight check and the user job, which can improve computation efficiency and enhance user experience. This also provides the real-time current status of the hardware accelerator machine 235a-d at the time the user job is being deployed.

The preflight checker binary can be used to configure hardware accelerators, hardware accelerator machines, or other card or tray components included in a distributed system based on the workload configuration. The details of configuring hardware components are described below.

The preflight checker binary can include operations for performing an overall health check on hardware accelerator machines and associated components, e.g., networking components that connect the hardware accelerators within the machines and that connect the machines (and/or their accelerators) to other machines (and/or their accelerators). This overall health check can include determining whether there are hardware failures in a subset of hardware accelerator machines assigned to a user job. Based on the types of hardware accelerator machines and the user job, the overall health check can include verifications of hardware functionality, e.g., by performing arithmetic or logic operations, determining interconnection bit-error rates (BERs, i.e., a number of bit errors per unit time), topology errors, or checking interconnections of a subset of hardware accelerator machines. If the preflight check (or a task action) is successfully executed on a hardware accelerator machine by the cluster management system, the cluster management system can determine there are no hardware failures in the subset of hardware accelerator machines. Otherwise, the cluster management system can determine one or more hardware failures based on the types of verifications specified in the preflight checker binary.

For each preflight check of a preflight checker binary, when executed by a node manager, can determine whether a corresponding accelerator responds with an output within a predetermined time period, and determine whether the output is accurate compared against a ground-truth value. The operations for generating the output can be based on matrix operations or other operations associated with machine learning computations that are typically performed during the execution of a computing workload. Whenever either the accelerator does not respond or provides an incorrect output, the node manager can determine that the preflight check (or a task action) fails, identify the hardware failures, and provide diagnostic information for corrective actions. These identified failures and/or diagnostic information can vary based on whether the accelerator did not respond or whether the output was incorrect.

Similarly, for interconnections, each preflight check, when executed by a node manager, can determine an interconnection failure such as a mistakenly connected link, a failed link, or a link with poor quality (e.g., having BERs higher than a threshold value). The pass or failure of a preflight check can indicate whether a hardware accelerator or a hardware accelerator machine can perform operations of the computing workload successfully. A cluster manager can replace the hardware accelerator machines that fail the preflight check with other machines, and restart the preflight checks on the other machines until no hardware failures are found or a predetermined iteration limit is reached. Additional details of executing a preflight checker binary are described below.

In some situations where the cluster management system determines one or more hardware failures, the cluster management system can generate diagnostic information indicating reasons or symptoms for further analyzing the hardware failures or providing the information to a repair workflow as context information. For example, the system can generate information indicating one or more hardware accelerator failures, in response to determining that an output generated by performing a simple arithmetic operation using one or more hardware accelerators is not accurate compared with a ground-truth value. The system can then identify the malfunctioning hardware accelerators and encode relevant data into the diagnostic information. As another example, the system can determine that an inaccurate output might be due to a link failure, and in response, the system can identify the failed link or interconnection and encode relevant data into the diagnostic information. The system can provide the diagnostic information to a node manager (e.g., node manager 255a-d of FIG. 2), a machine manager (e.g., machine manager 250a-d of FIG. 2), or directly to a repair workflow, or any appropriate combination thereof. The identified hardware accelerators, machines, or interfaces of the hardware failures can be treated using a set of predefined actions automatically or by technicians or engineers, e.g., rebooting the hardware accelerator machine, reinstalling program code package on the machine, or replacing components (trays) of the machine.

In the following sections, different implementations of the preflight checker binary are described in greater detail in connection with different types of hardware accelerator machines 235a-d as shown in FIG. 2.

As described above, the hardware accelerator machines can have different types. For example and in connection with FIG. 2, the accelerator machine A 235a can include hardware accelerators A 265a that are not directly connected to the network 230 but can still communicate with the network 230 through the host (e.g., the machine 235a). As another example, the accelerator machine B 235b can include accelerators B 265b that are directly coupled with the network 230a through a network interface card (NIC).

In some implementations, the hardware accelerators in a hardware accelerator machine can be connected to a bag-on-the-side network. For example, accelerator machine C 235c can include accelerators C 265c that are connected to the bag-on-the-side network 275. As another example, accelerator machine D 235d can include accelerators D 265d that are connected to the bag-on-the-side network 275. A centralized topology manager 280 can be connected to the bag-on-the-side network 275 and configured to manage topology (e.g., connectivity) of accelerators or machines in the bag-on-the-side network 275 due to configurations of a user job. The functionalities of the centralized topology manager 280 are described in more detail below.

For hardware accelerator machines having accelerators that are not connected to a bag-on-the-side network, the cluster management system can implement the preflight checker binary by integrating it into a user job, such a preflight checker binary is also referred to as "application-level preflight checker binary" because the preflight checker binary is based at least in part on the characteristics of a corresponding user job. As shown in FIG. 2, preflight checker binaries 245a and 245b are integrated into user jobs 1 and 2 for the hardware accelerator machine A 235a; checker binaries 245c and 245d are integrated into user jobs 3 and 4 for the hardware accelerator machine B 235b; and checker binaries 245g and 245h are integrated into user jobs 7 and 8 for the hardware accelerator machine D 235d.

A preflight checker binary integrated into a user job on a hardware accelerator machine can specify operations for verifying at least "health conditions" for a hardware accelerator associated with the hardware accelerator machine. The preflight checker binary, when executed, can cause one or more hardware accelerators to fetch and run a mini sample workload corresponding to the user job before performing the full user job. The mini sample workload can involve any level of hardware or software components associated with the machine, so the checker binary can perform a substantially full-stack preflight health check (e.g., a preflight health check over an entire distributed system from the front end that faces users to the back end (e.g., databases and architectures) and the program codes and/or interconnections that connect the two ends).

For example, the software components can include a driver, accelerator firmware, inter-accelerator network routing, and workflow set up, and the hardware components can include any suitable subcomponents of an accelerator such as on-chip caches, Arithmetic-logic units (ALUs), matrix multiplication units (MMUs), vector processing units (VPUs), instruction sequencers, off-chip dynamic random-access memory (DRAM) or high-bandwidth memory (HBM), accelerator-CPU PCI express, or other high-speed interconnect. In some implementations, the preflight checker binary can further specify operations for detecting intra-machine connectivity, i.e., interconnections between accelerators in a hardware accelerator machine.

One example of preflight check over one or more accelerators can include a checker binary. The checker binary can specify operations for performing a simple element-wise matrix multiplication using one or more accelerators. The simple matrix multiplication can be a small portion or replica from the user job or a predetermined test case for the user job. The node manager 255a-d can determine whether the output of the simple matrix multiplication is accurate or with errors bounded within a threshold value by comparing the output against a ground-truth value. If the output is determined to be not accurate or beyond the threshold value, the node manager can determine that at least one of the hardware accelerators in the hardware accelerator machine fails.

In addition, the node manager 255a-d can determine whether the hardware accelerators 265a-d are responsive to performing the checker binary and/or can generate an output after performing the operations specified in the checker binary. If the hardware accelerators do not respond or provide an output, the node manager 255a-d can determine that at least one of the hardware accelerators in the hardware accelerator machine fails.

In general, if any one of the above-mentioned processes fails, the cluster management system 200 can determine that there is at least one hardware accelerator failure in the hardware accelerator machine, and re-assign another hardware accelerator machine to perform the assigned computing workload.

As another example, a checker binary can include operations of performing an element-wise matrix multiplication followed by reduction operations for all the multiplication results. In this way, the cluster management system can determine whether the inter-accelerator communication or interconnection on the machine (e.g., accelerator machine B 235b of FIG. 2) is working properly. As a naive example, assume there are four accelerators communicatively coupled with each other and each having a multiplier-accumulator (MAC) unit, the checker binary can include operations of performing an element-wise multiplication of a first 2 by 2 matrix and a second 2 by 2 matrix. Each MAC unit can obtain a product of a respective element in the first matrix and a corresponding element in the second matrix. The checker binary can further include operations of reducing the four products into a sum. If any one of the accelerators suffers from an inter-accelerator interconnection issue, the sum would be inaccurate compared to a ground-truth value.

Referring back to accelerator machine B 235b, the inter-accelerator interconnection issue can generally occur between an accelerator and a host, an accelerator and a network interface card (NIC), between a NIC and a network, and between accelerators located on the same tray.

However, the inter-accelerator interconnection issue can also occur between accelerators in different trays in a machine or across two or more machines, where these accelerators are coupled with one or another by the network 230 (e.g., two type B accelerator machines 235b) or by the bag-on-the-side network 275 (e.g., two type C or D accelerator machines 235c and 235d, or a type C accelerator machine 235c and a type D accelerator machine 235d).

For hardware accelerator machines having accelerators that are connected to a bag-on-the-side network (e.g., type C and type D accelerator machine 235c, 235d of FIG. 2), the cluster management system can implement the preflight checker binary as a checker daemon installed on the hardware accelerator machines, and optionally implement the preflight checker by integrating checker binaries into user jobs.

Accelerator machine C 235c includes a checker daemon 270a, and accelerator machine D 235d includes a checker daemon 270b. For the accelerator machine C 235c, the preflight checker binary can be implemented as a checker daemon 270a only, and there are no checker binaries integrated with user jobs 5 and 6. For the accelerator machine D 235d, the preflight checker binary can be implemented as a checker daemon 270b, and optionally implemented as checker binaries 245g and 245h. The checker binaries 245g and 245h can be configured to perform health checks similar to those described above.

The preflight checker binary implemented as a checker daemon can specify health-checking operations to be performed as a background process. In this example, the process is not exposed to a user or user application, and the user can access the check results through a node manager installed on each machine, e.g., via a user interface provided by the node manager.

The operations specified by the checker daemon 270a or 270b can include operations of checking inter-accelerator connectivity. For example, the inter-accelerator connectivity can include an interconnection with accelerators within a single machine or across one or more machines using a bag-on-the-side network 275 (or a general high-performance network (HPN)), multiple accelerators of one or more machines can form a two-dimensional or three-dimensional torus or mesh, or a folded Clos network (i.e., a multistage circuit-switching network) when connecting to the bag-on-the-side network 275, controlled by a centralized topology manager 280 according to a user job.

Figure 6:
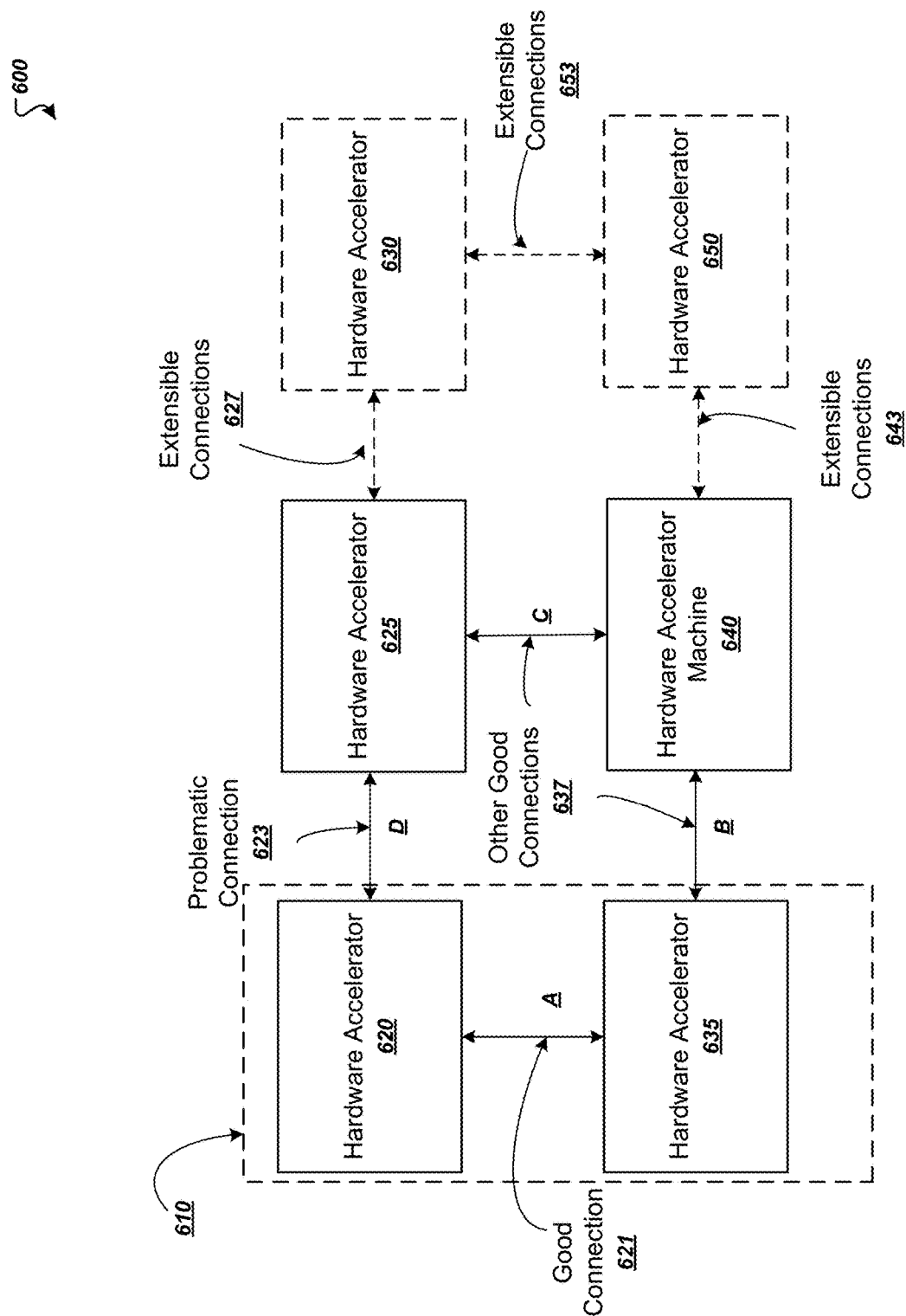
FIG. 6 is an example scenario of avoiding the failure of a task action when detecting a faulty connection associated with an unselected hardware accelerator.

Generally, the centralized topology manager 280 can determine a topology (e.g., an interconnection across accelerators in the HPN) based on the instructions from the cluster manager 220 according to a user job. The centralized topology manager 280 includes data representing a blueprint of the holistic interconnections, all components connected to the HPN, and any potential extensions to the HPN (e.g., additional accelerators and links). As shown in FIG. 6 and in connection with FIG. 2, the centralized topology manager 280 can maintain data representing a current two-dimensional topology for accelerators connected to the bag-on-the-side network 230. For example, the current topology can include a 2 by 2 mesh with four hardware accelerators 620, 625, 635, and 645 connecting with one another through links A, B, C, and D. The centralized topology manager 280 can also maintain data for connecting additional accelerators 630 and 650 using extensible connections 627, 653, and 643.

After the cluster manager 220 assigns a user job to a subset of hardware accelerator machines (e.g., 235c and 235d) and hardware accelerators (e.g., 265c and 265d) according to the characteristics of the user job, the centralized topology manager 280 can determine an interconnection between the accelerators using the HPN to perform the user job, and generate data representing the interconnection as the expected topology data. The expected topology data can include neighboring information for accelerators, status for each link connecting the accelerators, and bit-error rates (BERs).

The centralized topology manager 280 can further communicate with the checker daemons 270a and 270b new components added to or removed from the HPN and newly formed topology regarding the newly added or removed components. Therefore, the centralized topology manager 280 can easily generate expected topology data for updates in hardware components connected to the HPN.

The checker daemons 270a, 270b can include operations for determining interconnection failures. The interconnection failures can include miswirings or wrong neighboring information, poor link qualities, and failed interface connections. The operations can include checking whether an observed topology of the accelerators connected to the HPN matches with an expected topology controlled by the centralized topology manager 280. For example, the checker daemons can further include operations of verifying neighbor accelerators to an accelerator connected according to the expected topology. The node managers 255c and 255d can determine a miswiring or faulty neighboring information in response to determining a mismatch of the observed topology and the expected topology. The checker daemons can include operations of determining the link quality by measuring BERs in the topology and comparing the measured BERs with a pre-determined threshold value. The node managers 255c and 255d can determine a poor link quality whether the measured BERs exceed the predetermined threshold value.

In some implementations, the checker daemons 270a and 270b can further include operations of enabling or disabling a particular link connecting two accelerators in response to detecting a miswiring.

To determine interconnection failures, the checker daemon 270a and 270b can receive the expected topology data from the centralized topology manager 280 through network 230. The checker daemons 270a or 270b can also request telemetry data from the corresponding machine manager 250c or 250d. As described above, the telemetry data collected by a machine manager can include topology data representing an interconnection between assigned accelerators, where the topology data provided by the machine manager 250c or 250d is used as detected topology data. Then, the checker daemons 270a and 270b can compare the detected topology data against the expected topology data and determine interconnection failures.

The checker daemon can determine that a faulty or problematic connection associated with an unselected or un-assigned hardware accelerator will not cause preflight checks to fail, which are described in greater detail in connection with FIG. 6.

Figure 3:
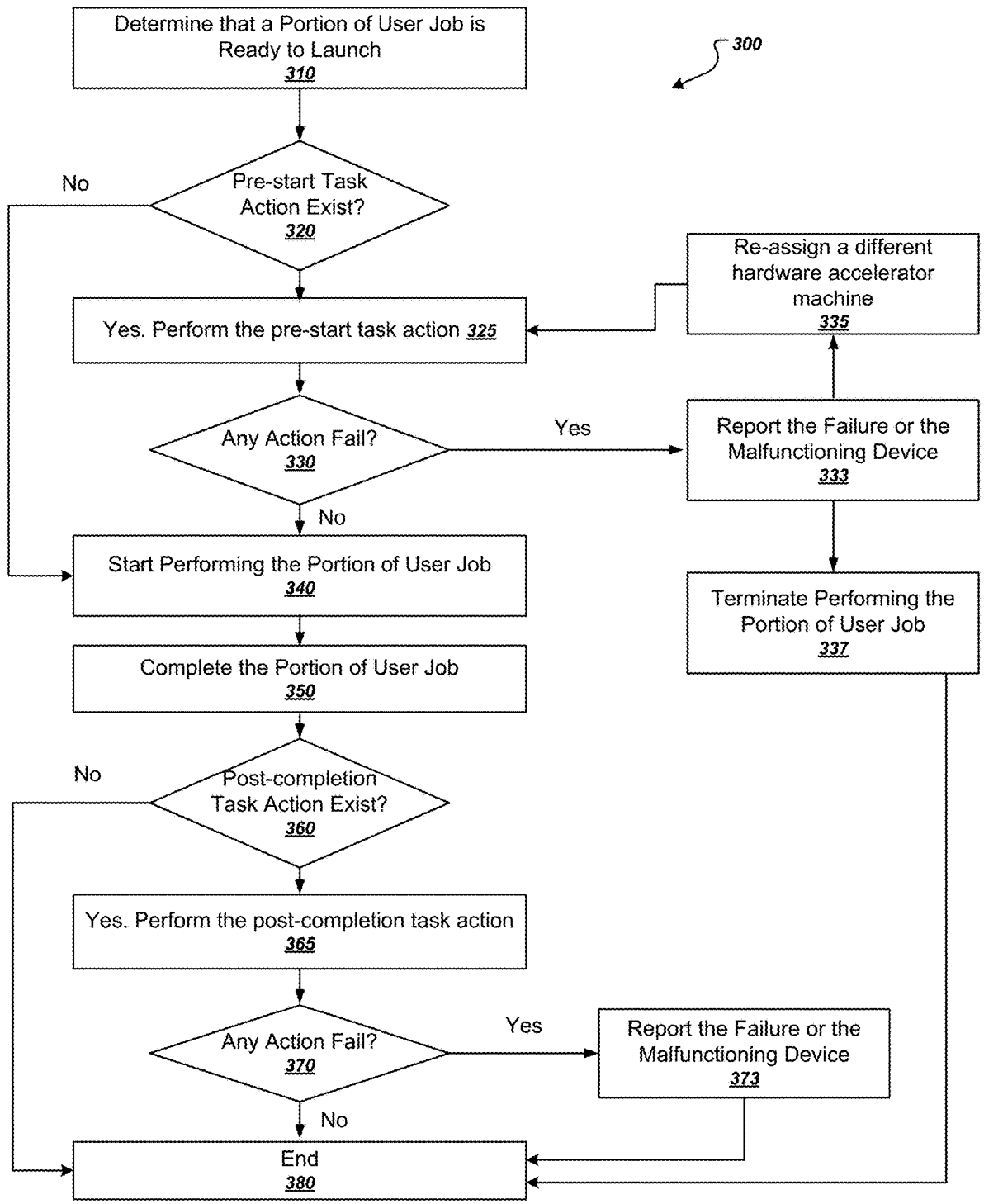
FIG. 3 is an example process of performing a task action on a hardware accelerator machine before and after performing a computing workload.

FIG. 3 is an example process 300 of performing a task action on a hardware accelerator machine before and after performing a computing workload. For convenience, the above-noted process 300 is described as being performed by a system of one or more computers located in one or more locations. For example, a system, e.g., the cluster management system 101 of FIG. 1, appropriately programmed, can perform the process 300.

After a node manager (e.g., node manager 255a of FIG. 2) installs the program code package instructed by a cluster manager (e.g., cluster manager 220 of FIG. 2), the node manager can execute a task action that includes a sequence of operations associated with a computing workload, e.g., a user job. For example, the task action can include operations of fetching a checker binary from the installed program code package to perform preflight checks.

In some implementations, a task action can include a pre-start task action to be performed before performing the assigned user job or a portion of the assigned user job, or a post-completion task action to be performed after completing the assigned user job or the portion of the assigned user job, or both.

As shown in FIG. 3, a node manager 255a determines that a portion of a user job assigned to a hardware accelerator machine 235a is ready to be launched (310), the node manager 255a can first determine whether a pre-start task action exists in the installed program code package (320).

In response to determining that there is no pre-start task action existing, the node manager 255a can start performing operations specified in the portion of the user job (340).

In response to determining that there is a pre-start task action existing, the node manager 255a can perform the pre-start task action (325).

The pre-start task action can include operations related to "health checks" over accelerators or interconnections as described above. For example, when a hardware accelerator machine does not have accelerators connected to a bag-on-the-side-network, a first type of pre-start task action for the hardware accelerator machine can include operations of launching a checker binary integrated into a user job to determine accelerator failures (and, optionally, intra-machine connection failures). The details of the first type of pre-start action are described in connection with FIG. 4. As another example, when two or more hardware accelerator machines have accelerators connected with one another via high-speed interfaces such as ICIs, a second type of pre-start task action can include operations of requesting checker daemons or launching a binary code installed on the machines to communicate with checker daemons to determine interconnection failures. The details of the second type of pre-start action are described in connection with FIG. 5.

In some implementations, the pre-start task action can include operations of loading or installing different firmware, or setting different hardware frequencies, or both, to different hardware accelerators based on characteristics of a user job. In this way, each hardware accelerator assigned to performing the user job is executed under custom settings, and the system can therefore significantly boost the computation efficiency and throughout.

The node manager 255a can determine whether the pre-start task action fails (330). In response to determining that the pre-start task action fails, the node manager 255a can report data representing a general failure indication to the cluster manager 220. Alternatively, the node manager 255a can report identified hardware accelerator failures or interconnection failures to the cluster manager 220 (333) so that the identified hardware accelerators or interfaces can be examined and repaired in a different workflow. In some implementations, the node manager 255a can provide diagnostic information representing context information for taking corrective actions, as described above.

After receiving the failure indication or report, the cluster manager 200 can select another machine to perform the portion of the user job. The node manager on the other machine can restart the process 300 to perform the preflight check for the newly assigned machine before launching the portion of the user job.

Next, the node manager 255a terminates performing the portion of the user job (337) and eventually stops performing further operations on the hardware accelerator machine (380). The node manager can optionally report to the cluster manager 220 that the current machine is "down" or "out of use" until the hardware failures are resolved.

The node manager 225a can re-assign a different hardware accelerator machine to perform the portion of the user job (335) and restart to perform the pre-start task action 325.

In response to determining that the pre-start task action does not fail, the node manager 255a starts to perform the portion of the user job (340). The cluster manager can deploy the user job on the selected hardware accelerator machines that have passed the preflight checks, and monitor the results of executing the user job.

Upon completing the portion of the user job, the node manager 255a determines whether a post-completion task action exists in the program code package (360). In response to determining there is no post-completion task action existing, the node manager 255a provides output data generated from the portion of the user job to the cluster manager 220 and stops performing further operations on the hardware accelerator machine (380) until a new portion of user job is assigned to the machine. If the portion of the user job has multiple operations with multiple outputs, the node manager 255a can provide the output data during execution of the portion of the user job, e.g., rather than waiting until the end.

In response to determining that a post-completion task action exists, the node manager 255a performs the post-completion task action (370). The post-completion task action can include operations of resetting parameters for accelerators on a machine or clearing up storage or memories associated with the machine, which can protect user privacy and minimize data leaks.

The node manager 255a can determine whether the post-completion task action fails (370) based on different criteria, e.g., whether the post-completion task action is successfully executed, whether the accelerator parameters are successfully reset, or whether the memories are all "cleaned up."

In response to determining that the post-completion task action does not fail (370), the node manager 255a can report output data generated from the portion of the user job to the cluster manager 220 and stop performing further operations on the hardware accelerator machine (380) until a new portion of user job is assigned to the machine.

In response to determining that the post-completion task action fails (373), the node manager 255a can generate a notification or failure information indicating that post-completion task action fails, and provide the results after performing the portion of the user job to the cluster manager 220. The node manager 225a stops performing further operations until the outstanding failure information has been taken care of (380).

Figure 4:
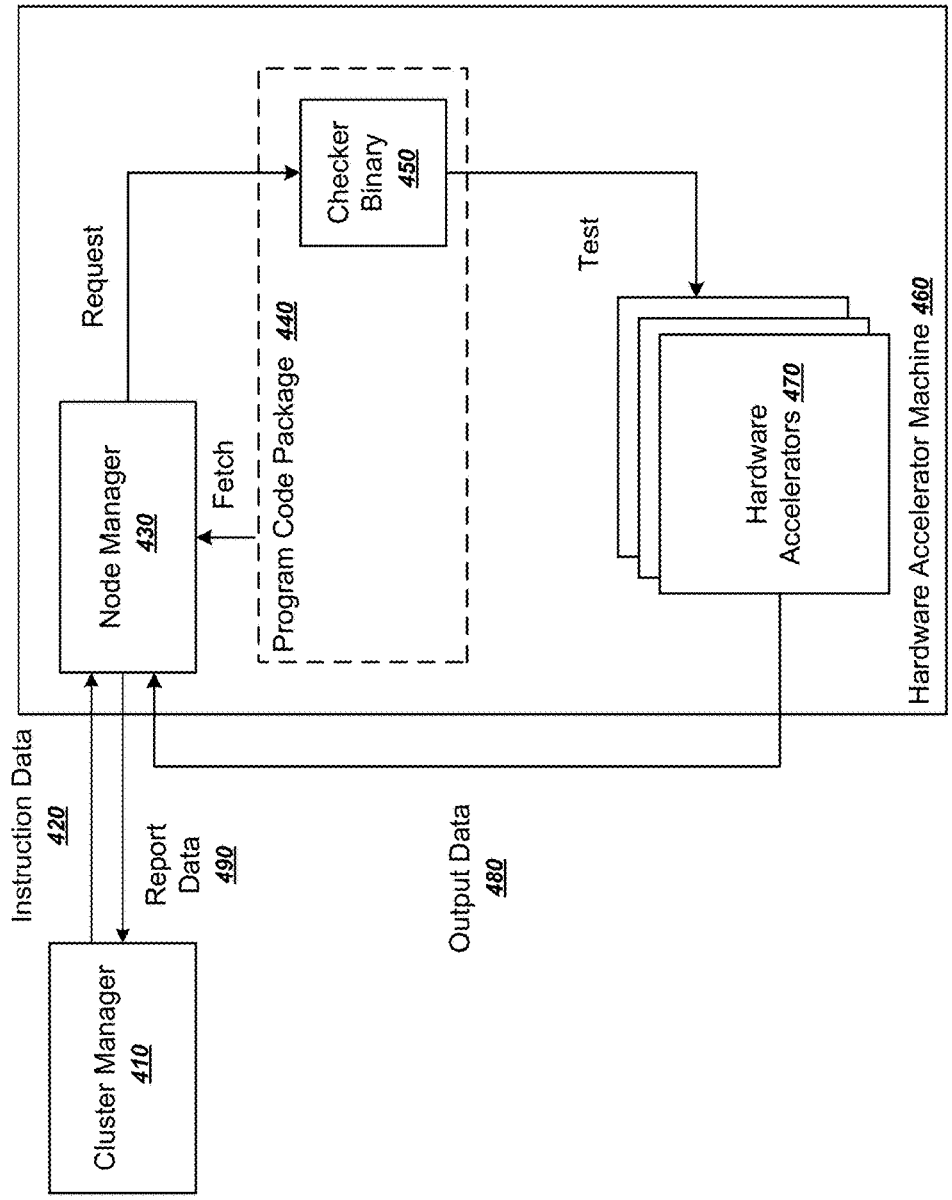
FIG. 4 illustrates an example workflow of performing operations specified in an application-level preflight checker binary.

FIG. 4 illustrates an example workflow 400 of performing operations specified in an application-level preflight checker binary. For convenience, the workflow 400 is described as being performed by a system of one or more computers located in one or more locations. For example, a system, e.g., the cluster management system 101 of FIG. 1, appropriately programmed, can perform the workflow 400.

As shown in FIG. 4, after receiving a computing workload, e.g., a user job, the cluster manager 410 can generate instruction data 420 and provide it to the node manager 430 on an assigned hardware accelerator machine 460. In this example, the hardware accelerator machine may not have accelerators connected to a bag-on-the-side network.

The instruction data 420 can include a program code package 440 including a portion of the user job assigned to machine 460. The node manager 430 can install the program code package 440 on the machine 460.

As described above, before launching the portion of the user job, the node manager 430 can fetch the program code package 440 installed on the machine, and request a checker binary 450 to perform a task action for testing one or more hardware accelerators 470. Please note the checker binary 450 is implemented by integrating it into the portion of the user job, as described above.

The node manager 430 can determine whether the action task fails based on the output data 480 returned when performing the action task. The node manager 430 can then provide report data 490 to the cluster manager 410. The report data 490 can include a failure notification or report regarding hardware accelerators and interconnections when the task action fails. The cluster manager can mark the hardware accelerator machine 460 as "down," "not available," or "failed," provide the received failure report to assist in performing corrective actions, e.g., repairing, for the identified hardware accelerators or interfaces, and select another machine to perform the portion of the user job. When the task action does not fail, the report data 490 can include results calculated by performing the portion of the user job, and the cluster manager 410 can aggregate the received results from different portions of the user job and generate an output for the user job.

Figure 5:
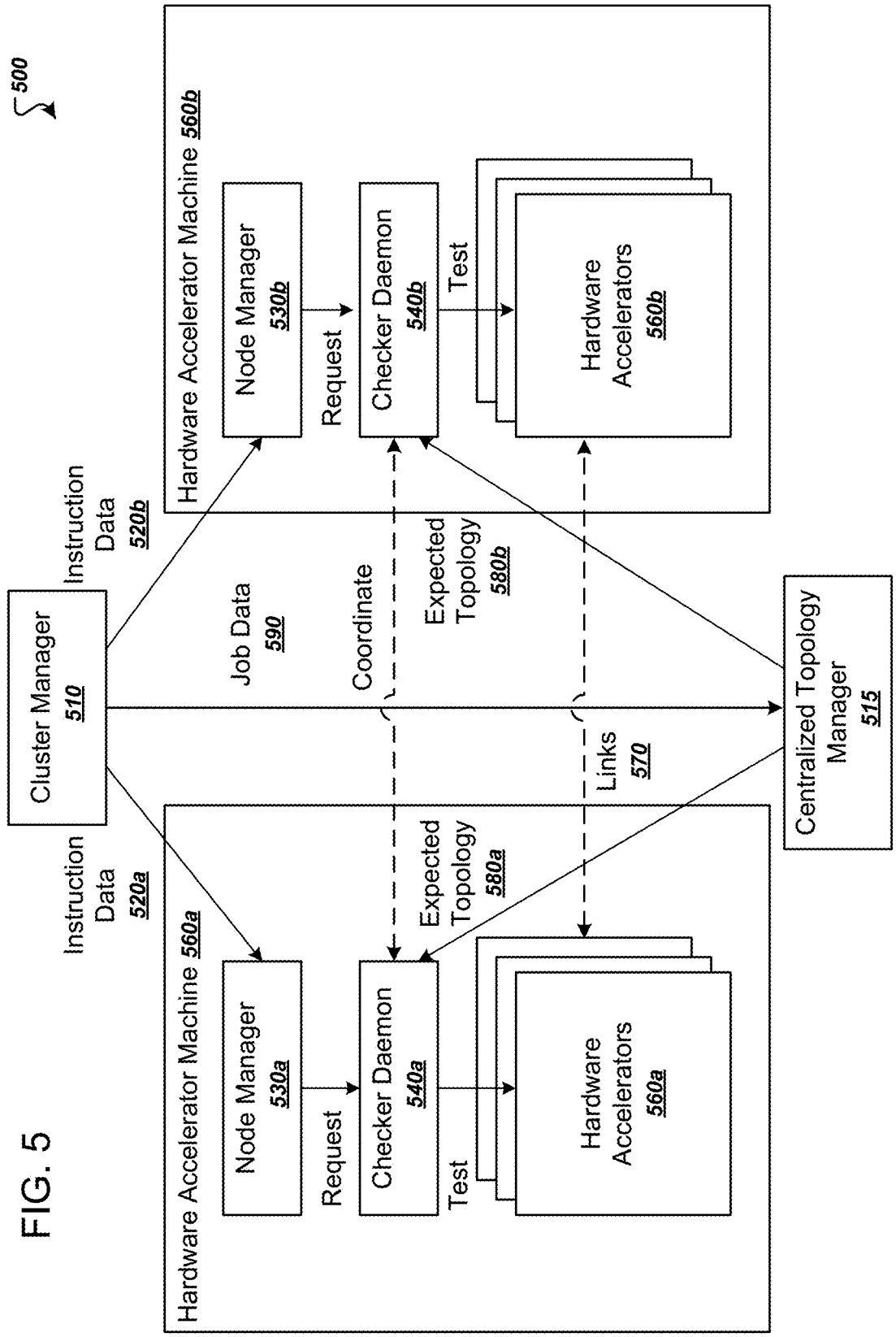
FIG. 5 illustrates an example workflow of performing operations specified in a preflight checker daemon.

F FIG. 5 illustrates an example workflow 500 of performing operations specified in a preflight checker daemon. For convenience, the workflow 500 is described as being performed by a system of one or more computers located in one or more locations. For example, a system, e.g., the cluster management system 101 of FIG. 1, appropriately programmed, can perform the workflow 500.

As shown in FIG. 5, two or more hardware accelerator machines 560a and 560b can have accelerators 560a and 560b connected with one another via high-speed interfaces (e.g., links 570) such as ICIs. Unlike the workflow 400, the preflight checks require checking inter-machine connectivities, and the preflight checks can be implemented as checker daemons 540a and 540b.

In general, upon assigning a different portion of a computing workload (e.g., a user job) to the hardware accelerator machines 560a and 560b, the cluster manager 510 can generate instruction data 520a and 520b and provide the instruction data to the hardware accelerator machines 560a and 560b, respectively. The instruction data can include checker daemons 540a and 540b to be installed on the machines 560a and 560b, respectively.

The cluster manager 510 can further provide job data 590 to the centralized topology manager 515. The job data 590 includes data representing quantities and types of hardware accelerators required to perform the portions of the user job. The centralized topology manager 515 can generate expected topology data based on the job data 590, and provide the expected topology data 580a to the hardware accelerator machine 560a and the expected topology data 580b to the hardware accelerator machine 560b.

Before performing a respective portion of the user job on each machine 560a, 560b, the node managers 530a and 530b can perform a task action. The task action can include requesting checker daemons 540a and 540b to test the interconnectivity of hardware accelerators 560a and 560b. More specifically, the node managers 530a and 530b can request checker daemons 540a and 540b to fetch the expected topology data 580a and 580b, respectively. The checker daemons 540*a* and 540*b* can also fetch telemetry data representing the observed topology data from hardware accelerators 560*a*, 560*b* directly. The checker daemons can determine inter-accelerator or inter-machine interconnection failures using one or more criteria and/or processes. The one or more criteria and/or processes are designed to determine the all-to-all routability for a subset of hardware components that are selected for performing a user job. The cluster management system can determine that an interconnection is healthy only if all of the criteria and/or processes for the interconnection are satisfied or performed. For example, the criteria and/or processes can include at least one of: (i) whether a link physical layer status indicates that the link physical layer is properly functioning, (ii) determining whether a per-lane BERs is smaller than a threshold value, checking per-lane status flags to ensure there is no loss of lock (LOL) an loss of signal (LOS), (iii) checking whether a transceiver cable is plugged in, whether the transceiver is responding to a node manager, and whether the configuration for the transceiver cable is valid, and whether the transceiver is included in a pre-defined list, (iv) determining whether a transceiver cable type matches a predefined or required type for an expected topology, (v) examining whether a transceiver transmitter and/or receiver is running under a pre-defined power threshold, (vi) determining whether neighboring nodes for a given node are the same as represented in an expected topology, (vii) and determining whether all of the above-noted criteria or processes are satisfied for at least a pre-defined time period. As a naive example, the cluster management system can determine an interconnection failure by comparing the expected topology data and observed topology data on respective machines. In addition, the checker daemons 540*a* and 540*b* can coordinate with each other to determine inter-machine interconnection failures, e.g., the performance of links 570 connecting the hardware accelerators 560*a* and 560*b*.

FIG. 6 is an example scenario 600 of avoiding the failure of a task action when detecting a faulty connection associated with an un-selected hardware accelerator.

As described above, a centralized topology manager (e.g., centralized topology manager 280 of FIG. 2 or 515 of FIG. 5) can maintain data representing holistic connectivity of hardware accelerators in different bag-on-the-side network topologies (e.g., a two-dimensional or three-dimensional mesh or torus). Upon receiving a computing workload (e.g., a user job), the cluster manager can assign a portion of the user job to multiple hardware accelerators. For example, the cluster manager can select a 2 by 1 mesh 610 including hardware accelerators 620 and 635 to perform the portion of the user job.

No matter whether the selected hardware accelerators are located in the same hardware accelerator machine or coupled with each other through HPN or ICIs, the cluster management system can perform a task action for preflight checks including determining interconnection failures for hardware accelerators. As shown in FIG. 6, the cluster management system can determine that link A between the selected accelerators 620 and 635 belongs to a good connection 621, and link D connecting a selected accelerator 620 and an un-selected accelerator 625 is a problematic connection 623. The cluster management system can further determine that links B and C belong to other good connections 637. Although link D is a faulty connection, the system does not determine that the task action fails because the faulty link D does not belong to the interconnection of the 2 by 1 mesh. In fact, the system ignores connections that are not used or selected for performing a user job. In this way, the system can perform a task action for interconnection to check only over links between assigned accelerators—not all the links among all the accelerators, which improves the computation efficiency for preflight checks over interconnections.

Figure 7:
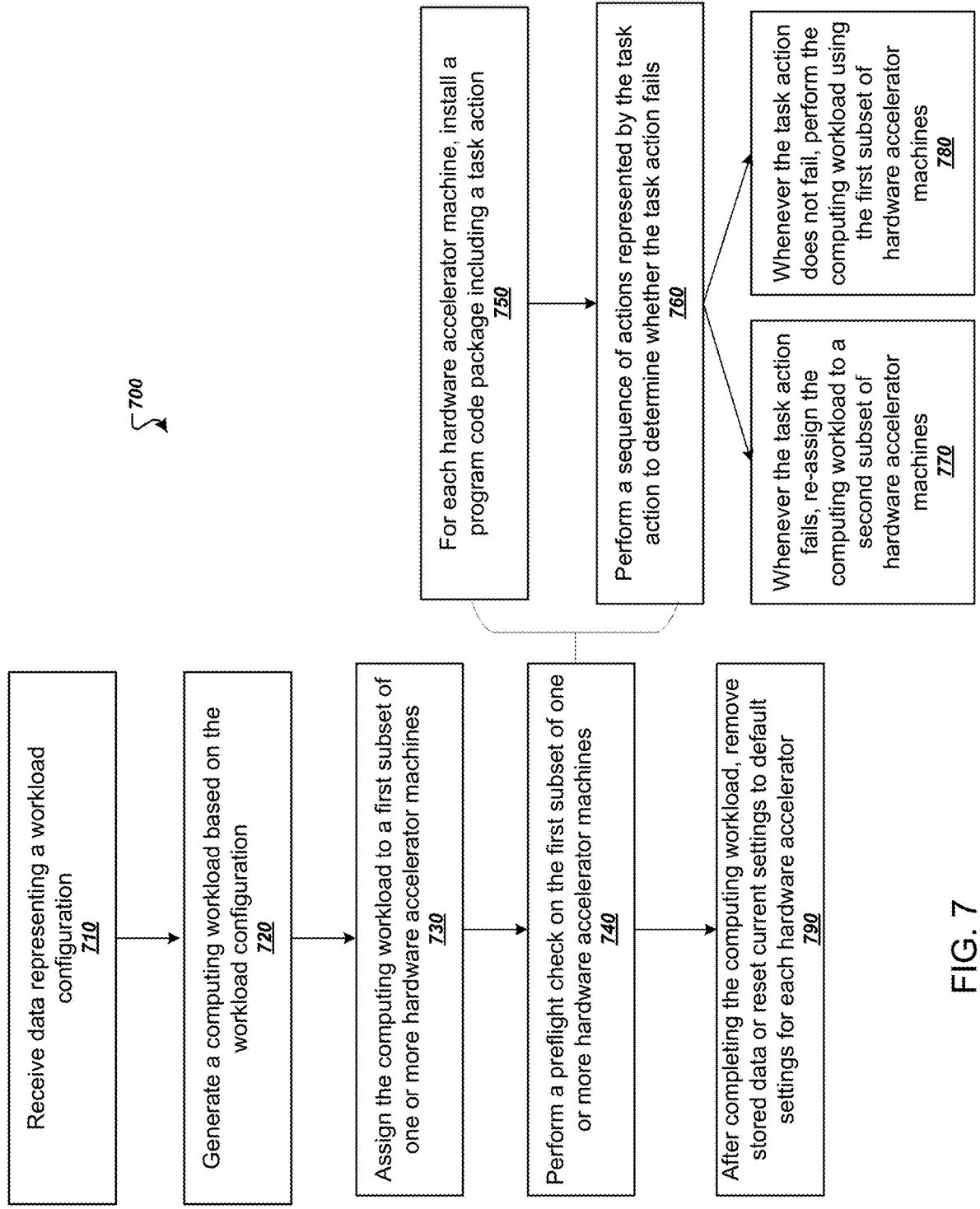
FIG. 7 is a flow diagram of an example process of performing a preflight check in a cluster management system.

FIG. 7 is a flow diagram of an example process 700 of performing a preflight check in a cluster management system. For convenience, the process 700 is described as being performed by a system of one or more computers located in one or more locations. For example, a system, e.g., the cluster management system 101 of FIG. 1, appropriately programmed, can perform the process 700.

The system can receive data representing a workload configuration (710). The data can be provided by a user or a user device and received by a cluster manager of the system. As described above, the workload configuration can include data specifying operations to be performed, quantities and types of hardware components required for performing the operations, and an estimated runtime period.

The system can generate a computing workload based on the workload configuration (720). More specifically, the cluster manager of the system can generate the computing workload for performing operations.

The system can assign the computing workload to a first subset of one or more hardware accelerator machines (730). The cluster manager can select the first subset from a set of hardware accelerator machines included in a distributed system. Each machine of the set of hardware accelerator machines includes one or more hardware accelerators. Alternatively, the cluster manager can select a first subset of hardware accelerators from all hardware accelerators in the distributed system. The first subset of hardware accelerators can be located in one or more hardware accelerator machines. The hardware accelerators can include one or more GPUs, TPUs, VPUs, FPGAs, and ASICs.

Before performing the computing workload, the system can perform a preflight check on the first subset of one or more hardware accelerator machines (740). The preflight check can include operations to verify the functionality of the first subset of one or more hardware accelerator machines. As described above, the system can verify the functionality of hardware accelerator machines based at least in part on characteristics of hardware accelerators and the user job. As described above, the verification can include checking at least one or more arithmetic errors, interconnection bit-error rates, topology errors, or interconnections of the first subset of one or more hardware accelerator machines. For example, the system can determine hardware accelerator failures or interconnection failures through the preflight check.

More specifically, for each hardware accelerator machine of the first subset of one or more hardware accelerator machines, the system can install a program code package at the hardware accelerator machine (750). The program code package can include a respective task action representing a sequence of operations to be performed by the node manager at the hardware accelerator. The respective task action can be based at least in part on the characteristics of the computing workload.

The system (or the node manager of the system) can then perform the sequence of operations on the hardware accelerator machine to generate an output indicating whether the respective task action fails (760). In general, the system can determine that the task action fails based on a determination that at least one of the hardware accelerators or interconnections fail. The details of the determination process are described in connection with FIG. 3.

Whenever the respective task action fails, the system can re-assign the computing workload to another subset of hardware accelerator machines different from the first subset (770). For example, assuming the system determines a hardware accelerator fails in a first hardware accelerator machine in the first subset, the system can replace the first hardware accelerator machine with another accelerator machine outside the first set in the distributed system.

Whenever the respective task action does not fail, the system can perform the computing workload using the first subset of hardware accelerator machines (780).

After completing the computing workload, the system can remove stored data or reset current settings to default settings for each hardware accelerator machine of the first subset of one or more hardware accelerator machines (790). More specifically, the system can un-install firmware installed on one or more hardware accelerators, clear up memories and storage associated with one or more hardware accelerators, and reset parameters to default for one or more hardware accelerators in the first subset of one or more hardware accelerator machines.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, e.g., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program which may also be referred to or described as a program, software, a software application, an app, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

For a system of one or more computers to be configured to perform particular operations or actions means that the system has installed on it, software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse, trackball, or a presence sensitive display or other surface by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone, running a messaging application, and receiving responsive messages from the user in return.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

In addition to the embodiments described above, the following embodiments are also innovative:

Embodiment 1 is a method comprising receiving, by a cluster manager, data representing a workload configuration; generating, by the cluster manager, a computing workload representing a set of operations to be performed based on the workload configuration; assigning, by the cluster manager, the computing workload to a first subset of one or more hardware accelerator machines among a set of hardware accelerator machines, wherein each of the set of hardware accelerator machines include one or more hardware accelerators; before performing the computing workload, performing a preflight check on the first subset of one or more hardware accelerator machines to verify a functionality of the first subset of one or more hardware accelerator machines, wherein performing the preflight check comprises: for each hardware accelerator machine of the first subset of one or more hardware accelerator machines: installing a program code package at the hardware accelerator machine, the program code package comprising a respective task action representing a sequence of operations to be performed by a node manager at the hardware accelerator machine, the respective task action being based at least in part on characteristics of the computing workload; performing, by the node manager, the sequence of operations on the hardware accelerator machine to generate an output indicating whether the respective task action fails; whenever the respective task action fails, re-assigning the computing workload to a second subset of hardware accelerator machines different from the first subset; and whenever the respective task action does not fail, performing the computing workload using the first subset of hardware accelerator machines.

Embodiment 2 is the method of embodiment 1, wherein verifying the functionality of the first subset of one or more hardware accelerator machines is based at least in part on characteristics of one or more hardware accelerators of the first subset of one or more hardware accelerator machines and the characteristics of the computing workload, wherein verifying the functionality further comprises checking at least one or more arithmetic errors, interconnection bit-error rates, topology errors, or interconnections of one or more hardware accelerators in the first subset of one or more hardware accelerator machines.

Embodiment 3 is the method of embodiment 1 or 2, further comprising: after completing the computing workload, removing stored data or resetting current settings to default settings for each hardware accelerator machine of the first subset of one or more hardware accelerator machines.

Embodiment 4 is the method of any one of embodiments 1-3, further comprising: detecting a failure of the computing workload during performing the computing workload; and in response, by the cluster manager, re-assigning the computing workload to a third subset of hardware accelerator machines different from the first and second subsets.

Embodiment 5 is the method of any one of embodiments 1-4, wherein the respective task actions each comprise a pre-start task action or a post-completion task action, wherein the pre-start task action comprises a first sequence of operations to be performed by the node manager at the hardware accelerator machine before performing the computing workload, wherein the post-completion task comprises a second sequence of operations to be performed by the node manager at the hardware accelerator machine after completing the computing workload.

Embodiment 6 is the method of any one of embodiments 1-5, further comprising: in response to determining that the respective task action fails, generating data indicating failure information associated with the hardware accelerator machine; and terminating performing the respective task action.

Embodiment 7 is the method of any one of embodiments 1-6, wherein the sequence of operations comprises: launching, by the node manager at the hardware accelerator machine, a preflight checker binary included in the installed program code package.

Embodiment 8 is the method of embodiment 7, wherein an implementation of the preflight checker binary comprises the preflight checker binary being integrated into the computing workload or being installed on the hardware accelerator machine as a machine daemon, wherein the implementation is determined based at least in part on one or more of a measure of disk space consumption, root privilege of an operating system, or release cadence.

Embodiment 9 is the method of embodiment 7 or 8, wherein the preflight checker binary comprises instructions, when executed by one or more hardware accelerators of the hardware accelerator machine, causing the one or more hardware accelerators in the hardware accelerator machine to perform a portion of the assigned computing workload to generate a job output.

Embodiment 10 is the method of embodiment 9, wherein generating the output indicating whether the respective task action fails comprises: comparing the job output with a reference output; and determining that the respective task action fails in response to determining that the job output is different from the reference output by a threshold value.

Embodiment 11 is the method of any one of embodiments 7-10, wherein the preflight checker binary is a checker daemon installed on the hardware accelerator machine, when executed, that is configured to determine an interconnection failure among one or more hardware accelerators in the first subset of one or more hardware accelerator machines, wherein the determination of the interconnection failure is based on topology data provided by a centralized topology manager, the topology data representing an interconnection between hardware accelerators in the first subset of one or more hardware accelerator machines.

Embodiment 12 is the method of embodiment 11, wherein generating the output indicating whether the respective task action fails comprises: obtaining, as an expected topology data for the first subset of hardware accelerator machines, the topology data from the centralized topology manager based on the computing workload; obtaining, as an observed topology data for the first subset of hardware accelerator machines, telemetry data comprising at least a representation of an observed interconnection between hardware accelerators in the first subset of one or more hardware accelerator machines; and generating the output indicating that the respective task action fails, in response to determining an interconnection failure based on the expected topology and the observed topology.

Embodiment 13 is the method of embodiment 12, wherein the determination of the interconnection failure comprises examining wiring information of neighboring hardware accelerators with respect to a given hardware accelerator in the first subset of one or more hardware accelerator machines, or a quality of inter-accelerator links connecting one and another hardware accelerators in the first subset of one or more hardware accelerator machines.

Embodiment 14 is the method of any one of embodiments 1-13, wherein the respective task actions further comprise loading different firmware or setting different hardware settings for one or more hardware accelerator machines of the first subset.

Embodiment 15 is the method of any one of embodiments 1-14, wherein the set of hardware accelerator machines comprises: a hardware accelerator machine including one or more hardware accelerators that are connected to a network through a host, a hardware accelerator machine including one or more hardware accelerators that are directly connected to a network via a high speed interface, and a hardware accelerator machine including one or more hardware accelerators connected with each other through a bag-on-the side network.

Embodiment 16 is a system comprising one or more computers and one or more storage devices storing instructions that are operable, when executed by the one or more computers, to cause the one or more computers to perform the method of any one of embodiments 1 to 15.

Embodiment 17 is a computer storage medium encoded with a computer program, the program comprising instructions that are operable, when executed by data processing apparatus, to cause the data processing apparatus to perform the method of any one of embodiments 1 to 15.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain cases, multitasking and parallel processing may be advantageous.

What is claimed is:

1. A method comprising:
    performing a preflight check on a set of hardware accelerator machines to verify a functionality of the set of hardware accelerator machines before performing a computing workload assigned to the set of hardware accelerator machines, comprising:
        for each hardware accelerator machine of the set of hardware accelerator machines,
            transmitting data including a program code package to the hardware accelerator machine, the program code package comprising a task action representing a sequence of operations to be performed by a node manager in the hardware accelerator machine, the task action being based at least in part on characteristics of the computing workload;
            executing, by the node manager, at least a portion of the sequence of operations represented by the task action in the program code package to generate a preflight output that indicates whether the task action fails; and
        in response to determining that the preflight output indicates that the task action fails on the hardware accelerator machine, re-assigning the computing workload to a different hardware accelerator machine.

2. The method of claim 1, wherein verifying the functionality of the set of hardware accelerator machines comprises examining an arithmetic error or topology error of the set of hardware accelerator machines.

3. The method of claim 1, wherein each of the task actions further comprises a post-completion task action for the corresponding hardware accelerator machine, wherein the post-completion task comprises a second sequence of operations to be performed by the node manager at the hardware accelerator machine after completing the computing workload, wherein the second sequence of operations comprise resetting machine parameters or clearing up storage for the corresponding hardware accelerator machine.

4. The method of claim 1, further comprising:
in response to determining that the respective task action fails, generating data indicating failure information associated with the hardware accelerator machine; and
terminating performing the respective task action.

5. The method of claim 1, wherein at least a portion of the program code package is installed on the hardware accelerator machine as a machine daemon, wherein the installation is determined based on a measure of disk space consumption, root privilege of an operating system, or release cadence.

6. The method of claim 1, wherein the sequence of operations comprises performing a portion of the computing workload assigned to the hardware accelerator machine to generate a job output.

7. The method of claim 6, further comprising:
comparing the job output with a reference output; and
determining that the task action fails in response to determining that the job output is different from the reference output by a threshold value.

8. The method of claim 1, wherein the sequence of operations comprises determining an interconnection failure between two or more hardware accelerators in the set of hardware accelerator machines according to expected topology data, the expected topology data representing an expected interconnection between two or more hardware accelerators in the set of hardware accelerator machines according to an assignment of the computing workload.

9. The method of claim 8, wherein determining the interconnection failure comprises:
obtaining the expected topology data for the set of hardware accelerator machines from a centralized topology manager;
obtaining observed topology data representing an observed interconnection between two or more hardware accelerators in the set of hardware accelerator machines; and
determining the interconnection failure based on the expected topology data and the observed topology data.

10. The method of claim 8, wherein the determining the interconnection failure further comprises determining a failed link between two hardware accelerators in the set of hardware accelerator machines or determining that a quality of a link between two hardware accelerators in the set of hardware accelerator machines is below a threshold quality value, wherein the quality of the link comprises a bit-error rate.

11. The method of claim 1, wherein the set of hardware accelerator machines comprises: a hardware accelerator machine including one or more hardware accelerators that are connected to a network through a host, a hardware accelerator machine including one or more hardware accelerators that are directly connected to the network via a high speed interface, or a hardware accelerator machine including one or more hardware accelerators connected with each other through a bag-on-the side network.

12. One or more computer-readable storage media storing instructions that, when executed by one or more computers, cause the one or more computers to perform respective operations, wherein the respective operations comprise:
performing a preflight check on a set of hardware accelerator machines to verify a functionality of the set of hardware accelerator machines before performing a computing workload assigned to the set of hardware accelerator machines, comprising:
for each hardware accelerator machine of the set of hardware accelerator machines,
transmitting data including a program code package to the hardware accelerator machine, the program code package comprising a task action representing a sequence of operations to be performed by a node manager in the hardware accelerator machine, the task action being based at least in part on characteristics of the computing workload;
executing, by the node manager, at least a portion of the sequence of operations represented by the task action in the program code package to generate a preflight output that indicates whether the task action fails; and
in response to determining that the preflight output indicates that the task action fails on the hardware accelerator machine, re-assigning the computing workload to a different hardware accelerator machine.

13. The one or more computer-readable storage media of claim 12, wherein the sequence of operations comprises performing a portion of the computing workload assigned to the hardware accelerator machine to generate a job output.

14. The one or more computer-readable storage media of claim 13, wherein the operations further comprise:
comparing the job output with a reference output; and
determining that the task action fails in response to determining that the job output is different from the reference output by a threshold value.

15. The one or more computer-readable storage media of claim 12, wherein the sequence of operations comprises determining an interconnection failure between two or more hardware accelerators in the set of hardware accelerator machines according to expected topology data, the expected topology data representing an expected interconnection between two or more hardware accelerators in the set of hardware accelerator machines according to an assignment of the computing workload.

16. The one or more computer-readable storage media of claim 15, wherein determining the interconnection failure comprises:
obtaining the expected topology data for the set of hardware accelerator machines from a centralized topology manager;
obtaining observed topology data representing an observed interconnection between two or more hardware accelerators in the set of hardware accelerator machines; and
determining the interconnection failure based on the expected topology data and the observed topology data.

17. A system comprising one or more computers and one or more storage devices storing instructions that when executed by one or more computers cause the one or more computers to perform respective operations, wherein the respective operations comprise:

performing a preflight check on a set of hardware accelerator machines to verify a functionality of the set of hardware accelerator machines before performing a computing workload assigned to the set of hardware accelerator machines, comprising:

for each hardware accelerator machine of the set of hardware accelerator machines, transmitting data including a program code package to the hardware accelerator machine, the program code package comprising a task action representing a sequence of operations to be performed by a node manager in the hardware accelerator machine, the task action being based at least in part on characteristics of the computing workload;

executing, by the node manager, at least a portion of the sequence of operations represented by the task action in the program code package to generate a preflight output that indicates whether the task action fails; and in response to determining that the preflight output indicates that the task action fails on the hardware accelerator machine, re-assigning the computing workload to a different hardware accelerator machine.

18. The system of claim 17, wherein the sequence of operations comprises performing a portion of the computing workload assigned to the hardware accelerator machine to generate a job output.

19. The system of claim 18, wherein the operations further comprise:

comparing the job output with a reference output; and determining that the task action fails in response to determining that the job output is different from the reference output by a threshold value.

20. The system of claim 17, wherein the sequence of operations comprises determining an interconnection failure between two or more hardware accelerators in the set of hardware accelerator machines according to expected topology data, the expected topology data representing an expected interconnection between two or more hardware accelerators in the set of hardware accelerator machines according to an assignment of the computing workload.

* * * * *